United States Patent Office 3,155,013
Patented Nov. 3, 1964

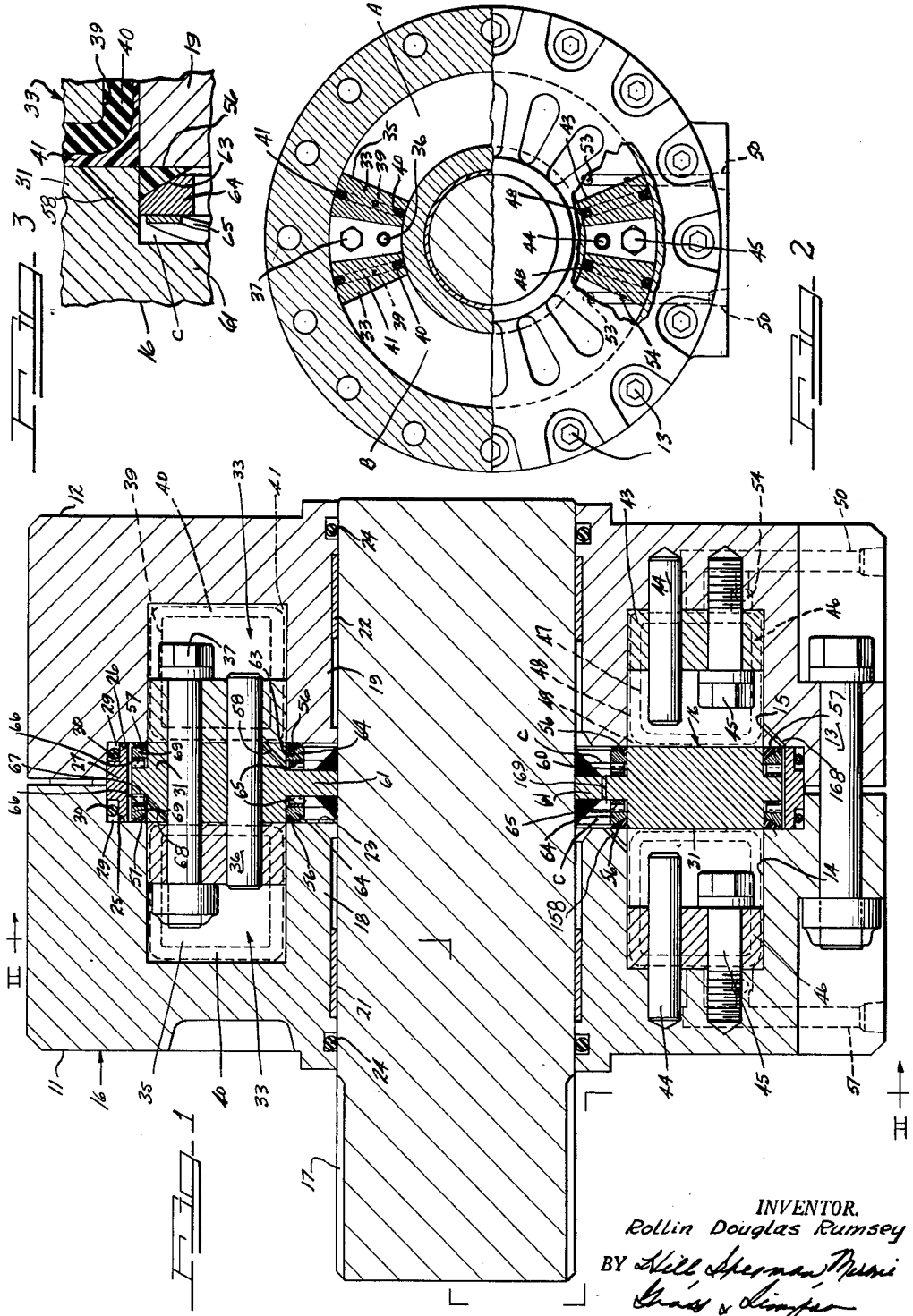

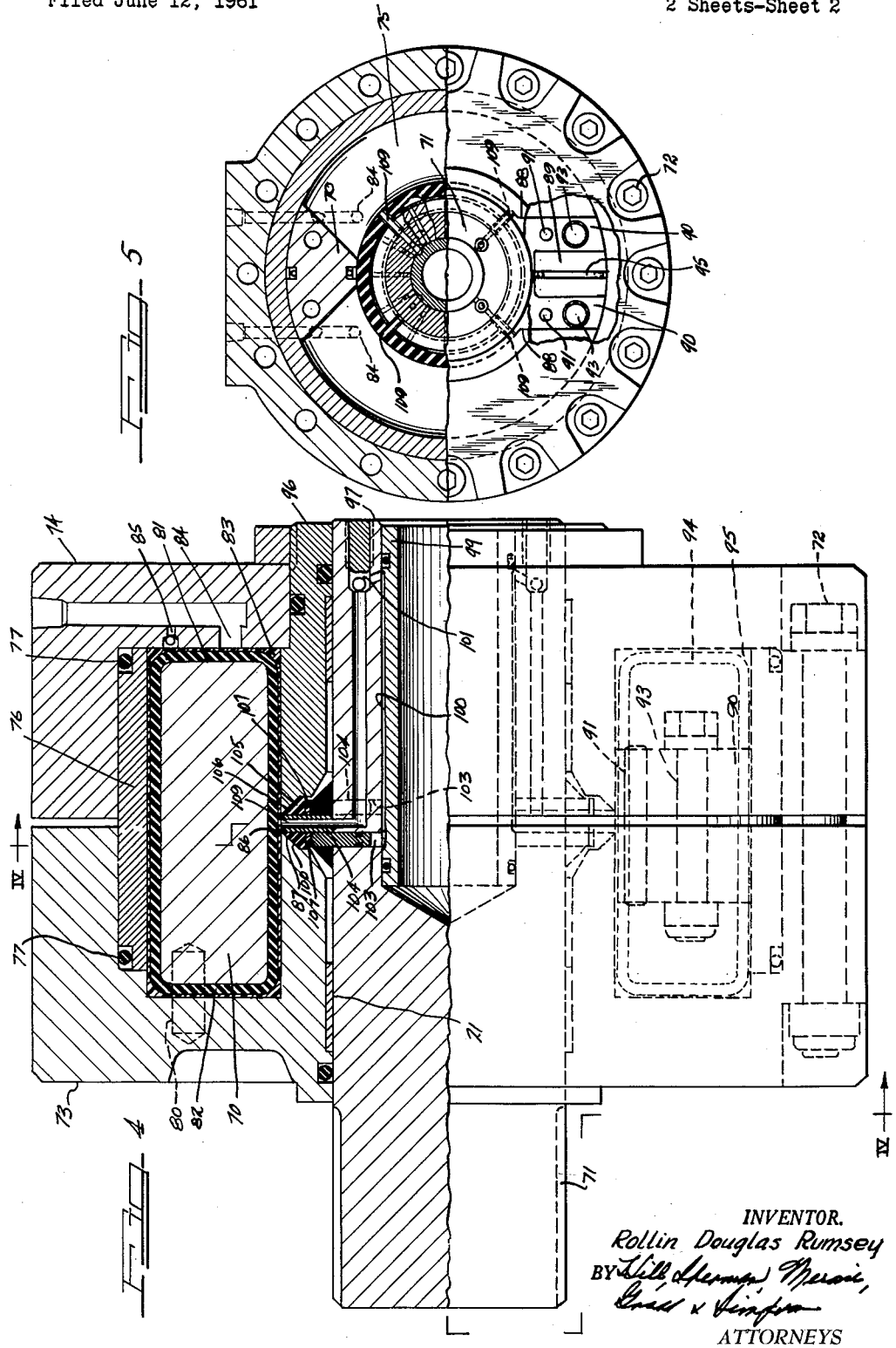

3,155,013
ROTARY ACTUATOR
Rollin Douglas Rumsey, Buffalo, N.Y., assignor to Houdaille Industries, Inc., Buffalo, N.Y., a corporation of Michigan
Filed June 12, 1961, Ser. No. 116,372
14 Claims. (Cl. 91—409)

This invention relates to improvements in rotary actuators and more particularly relates to an improved form of balanced rotary actuator and sealing means therefor.

A principal object of the invention is to provide an improved form of single vane rotary actuator, arranged with a view towards providing radial and axially balanced loads on the actuator.

Another object of the invention is to provide an improved form of balanced single vane rotary actuator arranged with a view towards simplicity and compactness in construction.

A further object of the invention is to provide a novel and improved form of balanced rotary actuator capable of rotating a device to be operated through at least 270° and cushioning the actuator at the ends of travel thereof.

A still further object of the invention is to provide an improved form of single vane hydraulic actuator in which the wing shaft is in the form of a disk having aligned vanes projecting from opposite sides thereof, providing working chambers on each side of the wing shaft disk and thereby balancing the loads of each side of the disk and eliminating axial thrust on the wing shaft.

A still further object of the invention is to provide a simplified two part housing structure for rotary actuators and the like, in which a single disk rotatably mounted in the space between the housing parts and having vanes projecting from opposite sides thereof forms a wing shaft of the actuator and in which the disk is sealed to the housing by double face seals outside and inside of the margins of the actuator chamber and thereby relieves the wing shaft from unbalanced radial and axial loads.

Still another object of the invention is to improve upon the seals between the wing shaft and actuator chamber of a rotary actuator by providing double face seals sealing the wing shaft from the actuator chamber.

A still further object of the invention is to provide an improved form of face sealing means for rotary actuators and the like, in which a series of radially extending pistons are provided to maintain the seal in sealing engagement with the face to be sealed.

These and other objects of the invention will appear from time to time as the following specification proceeds and with reference to the accompanying drawings wherein:

FIGURE 1 is a longitudinal sectional view taken through a rotary actuator constructed in accordance with the principles of the present invention;

FIGURE 2 is a sectional view taken substantially along lines II—II of FIGURE 1, and drawn to a reduced scale;

FIGURE 3 is an enlarged detail partial fragmentary sectional view taken at the juncture of a vane and face seal illustrating the sealing structure at a corner between a face and vane seal;

FIGURE 4 is a fragmentary longitudinal sectional view taken through a modified form of rotary actuator constructed in accordance with the principles of the present invention and the other half of the actuator shown in elevation; and FIGURE 5 is a fragmentary sectional view taken substantially along line V—V of FIGURE 4 and drawn to a reduced scale.

In the embodiment of the invention illustrated in FIGURES 1 and 2 of the drawings, I have shown a rotary hydraulic actuator having a housing 10 in two parts and including a housing part 11 and a housing part 12 facing the housing part 11 and secured thereto as by through bolts 13. The housing parts 11 and 12 have facing annular recessed portions 14 and 15 respectively, forming generally annular actuator chambers on opposite sides of a rotary disk 16 extending radially from an actuator shaft 17 and welded or otherwise secured thereto. The disk 16 with the shaft 17 forms the wing shaft of the actuator.

As shown in FIGURE 1, the housing parts 11 and 12 have inner annular wall portions 18 and 19 respectively, journalled on the shaft 17 on bearings 21 and 22, and having facing inner end portions spaced from each other and providing a slot 23 through which the disk 16 extends into the actuator chamber. The housing 11 is sealed to the shaft 17 at opposite ends of said housing by O-ring seals 24 recessed within the inner annular wall portions of the housing parts 11 and 12, and having sealing engagement with the periphery of the shaft 17.

The outer cylindrical walls of the recessed portions 14 and 15 of the respective housing parts 11 and 12 terminate into radially outwardly extending facing walls 25 and 26 spaced from each other and forming a sealing slot within which extends an annular spacer 27 having annular recesses 29 extending thereabout. The annular recesses 29 have O-rings 30 carried therein for sealing the housing parts 11 and 12, the spacer 27 maintaining the housing parts in the proper spaced relation with respect to each other.

The disk 16 has a portion 31 between the actuator chambers formed by the facing recessed portions 14 and 15 of the respective housing parts 11 and 12, which is wider than the portion of said disk secured to the shaft 17 and which has vanes 33 secured to opposite faces thereof and extending within the recessed portions 14 and 15 of the respective housing parts 11 and 12. As shown in FIGURES 1 and 2, the vanes 33 each have circumferentially spaced vane parts 35 having a recessed portion therebetween. A dowel pin 36 and a through bolt 37 extend through the recessed portions of the vanes 33 between the vane parts 35 for securing the vanes 33 to opposite faces of the disk 16 in aligned relation with respect to each other.

Each vane part 35 has a groove 39 extending thereabout having an O-ring seal 40 therein (FIGURE 3). The O-ring seal 40 abuts the inner side of a generally rectangular plastic seal 41 extending about said O-ring seal and engaging the walls of the actuator chambers and sealing the vanes 33 to the annular actuator chambers. The O-rings 40 may be made from rubber or a well known substitute for rubber, while the seals 41 may be made from Teflon or nylon or a like plastic sealing material.

Abutments 43 similar to the vanes 33 are provided on opposite sides of the disk 16 within the annular actuator chambers and are aligned and secured to the housing parts 11 and 12 as by dowels 44 and machine screws 45 extending through reduced cross-sectional area parts 46 of the abutments 43. The abutments 43 like the vanes 33 have sealing grooves 47 extending thereabout on opposite sides of the reduced cross-sectional area portions of the vanes 43 and containing O-rings 48 within plastic seals 49, having right angled sealing faces sealing said abutments to the annular actuator chambers on opposite sides of the disk 16, and sealing opposite faces of said disk.

Fluid under pressure is admitted to the recessed portions or annular chambers 14 and 15 through inlets 50 and 51 leading into the recessed portions 14 and 15 respectively on opposite sides of the stationary abutments 43. It is, of course, understood that one inlet passageway 50 forms a pressure passageway, while the passageway 50 on the opposite side of the stationary abutment 43 forms a return passageway. Each passageway 50 has an inlet port 53 leading through a wall of the chamber 14 and has a radially outwardly spaced check valve chamber 54 leading into the annular chamber 14 from the inlet passageway 51 and having a check valve 55 therein. The check valve chamber 54 is partially covered by an abutment 43 to retain the valve 55 thereto. The inlet passageways 51 leading into the chamber 15 are like the inlet passageways 50 and have similar check valves to cushion the actuator, so need not be described in detail.

When fluid under pressure is entering the passageways 50 and 51 on one side of the abutment 43 and being returned through the opposite passageways on the opposite side of said abutment, as the disk 16 and vanes 33 rotate and the actuator is near the end of its strokes, the vanes 33 will first shut off the inlet ports. The check valves will then prevent the return of fluid through the return passageways and the fluid remaining in the actuator chamber will cushion the actuator toward the end of its stroke.

In the form of the invention just described, the inlets 50 and 51 give rapid response of the actuator to fluid under pressure entering the actuator chambers 14 and 15 on opposite sides of the disk 16. Where rapid response is not necessary or desirable, one inlet may be eliminated and the actuator chambers 14 and 15 may be connected together by cross ports (not shown) leading through the disk 16 close to the wing vanes 33.

The enlarged cross-sectional area portion of the disk 16, dividing the recessed portions or annular actuator chambers 14 and 15 from each other is sealed to said chambers by internal and external double face seals 56 and 57 respectively. The internal seals 56 may be made from a plastic material, such as Teflon or nylon or a like material and have right angled sealing faces, one of which faces engages a wall 59 of the slot 23 and the other of which faces engages an internal cylindrical wall 60 formed at the juncture of the enlarged cross-sectional area portion 31 of the disk 16, which is welded or otherwise secured to the shaft 17. The double face seal 56 has a beveled inner wall 63 engaged by a correspondingly beveled wall of a retainer ring 64. A pressure member such as a wave spring 65 is interposed between a reduced thickness portion 61 of the disk 16 and the retainer ring 64, and exerts pressure on said retainer ring to force the double face seal 56 into sealing engagement with the walls 59 and 66.

The external double face seals 57 are like the internal seals 56 and are pressed into sealing engagement with the respective walls of the recessed portions 25 and 26 by wave springs 66 abutting shouldered portions 67 of the disk 16 extending in the slot formed by the spaced walls 25 and 26 and pressing retainers 69 to press the double face seals into sealing engagement with the walls 25 and 26 and the external cylindrical walls of the disk 16. The retainer rings 69, thus force the double face seals 57 axially outwardly and radially inwardly, while the retainers 64 force the double face seals 56 axially outwardly and radially outwardly to effectively seal the annular actuator chambers formed by the recessed portions 14 and 15.

It may be seen from FIGURE 3 that at the junction of each face seal 56, and the Teflon wing seal 41 there are four intersecting 90° corners. Two of these corners are diametrically opposed and are formed of steel, and move relative to each other. The other two corners are of Teflon and also diametrically opposed and move relatively to each other. These corners are all sharp corners and intersect at a point which has no substantial area. There, therefore, can be no leakage along the corners. The Teflon face seal 56 and the Teflon wing seal 41 thus rub on steel and there is no wearing of Teflon on Teflon. This reduces the friction between the moving parts at the four corners, increases the life of the seals and at the same time reduces the leakage to substantially zero. The sealing structure at the junction of the face seals 57 and the wing seals 41 is the same as the structure of the face seals 56 and the wing seals 41 and the four corners intersect at a point having no area and the Teflon seals 57 and 41 rub on steel, with a resultant reduction in friction and increase in life of the seals.

It should here be understood that the face seals 56 and 57 are acted on by fluid under pressure in actuator chambers A or B, depending upon the direction of rotation of the actuator and which chamber is under pressure, and that the portions of said seals extending along the low pressure chamber are retained in sealing engagement with the faces to be sealed by fluid leaking behind the annular seals to a neutral region, herein designated as zone C and exerting pressure on the insides of the seals.

Fluid under pressure in the high pressure chamber A or B will thus act against the face seals 56 and 57 and lift said seals and permit the leakage of fluid into bearing annulus area C to lubricate the bearing, and into the space between the periphery of the disk 16 and the annular spacer 27. This same flow of fluid under pressure builds up pressure on the rear of the portions of the face seals which extend along the low pressure chambers of decreasing volume, causing these portions of the face seals to tightly seal. As the actuator shaft turns, therefore, the portions of the face seals doing a sealing job are continually decreasing until pressure is reversed.

The face seals 56 and 57, therefore, only operate part time, since only the portion of the face seal sealing off the low pressure chamber is pressurized. The portions of the face seals sealing off the high pressure chamber, therefore, simulate check valves, accommodating the leakage of fluid from the pressure zones A or B to C and to the periphery of the disk 16 and preventing the leakage of fluid from zone C to zones A or B. In actuators designed for conventional operations, the building up of pressure in zone C is of a distinct advantage in that it not only retains fluid under pressure in the zone C and thereby tends to balance the pressure on the portions of the face seals under pressure from the actuator chamber, but also lubricates the shaft bearings.

Where the actuator is designed for critical operations, however, and the seals are so designed as to have no leakage, the face seals many times are dead tight and remain pressurized after the release of pressure and cause high static friction with resultant seal failures.

These seal failures have been attributed to the fact that when fluid under pressure is applied to either chamber A or chamber B or both chambers, the actuator housing expands like a balloon and the ends of the housing are pressed outwardly a significant amount, which in an actuator like that of the present invention may be .004 inch for each end of the housing, and which results in an overall axial housing growth of approximately .008 inch. This is under pressure of approximately 3000 p.s.i. over the end housing area, or 80,000 pounds pressure.

Fluid under pressure in the actuator thus passes the face seals to zone C and holds the seals tight against surfaces which do not expand.

As pressure is relieved from the chambers A or B or both, oil is trapped in zone C and due to the expansion of the actuator, the volume of oil trapped is .004 inch longer than it was originally. Assuming that oil is incompressible, the trapped oil must now hold the covers .004 inch out if the seals do not leak.

In order to avoid this build up in pressure a shuttle valve capable of venting zone C back to whichever was the higher of zones A or B has been used. This shuttle valve must be able to move over either of two ports under flow conditions, such that the one connected to the lower pressure zone will be closed. Such valves are difficult to manufacture and expensive to install and for this reason have not been generally used.

In accordance with my present invention the seals 41 act as shuttle valves to relieve excessive pressure from zone C and a hole or passageway 58 is drilled diagonally through the thickened portion 31 of the disk 16 from zone C to a point midway across the vane seal 41 separating chamber A from chamber B. As long as the pressure in A or B is higher than C, no flow can go from C to either A or B, because the seals 41 are held flat in sealing engagement with the hole, closing the hole. If the pressure at C reaches an appreciable value, higher than the pressures in zones A or B, then this pressure lifts the seal 41 above the hole and the fluid escapes into chambers A or B. Similarly, when the actuator is shut down and chambers A and B are relieved from pressure, the pressure in zone C lifts the vane seal 41 and is relieved.

An escape passageway 68 is also provided, which leads from the space between the periphery of the disk 16 and the inner periphery of the spacer 27 to an abutment seal 41 to accommodate the escape of high pressure fluid from the periphery of the disk 16 to the zones or chambers A or B, whichever is under low pressure.

Similarly an escape passage 158 may be drilled diagonally through the annular wall portion 18 from zone C to a point midway across the abutment seal 49, to relieve pressure from zone C by lifting the seal 49 when the pressure in zone C is appreciably higher than the pressure in chambers A or B.

A passageway 168 may also be provided to accommodate the relief of high pressure fluid from the periphery of the disk 16 to chambers A or B, when the pressure along the periphery of the disk is appreciably higher than the pressure in chambers A or B.

Opposite sides of the disk 16 in zone C are connected together by a cross passageway 169 leading through the reduced cross-sectional area portion 61 of the disk 16. The cross passageway 169 connects the zones C on opposite sides of the reduced area portion 61 of the disk 16 together and thereby enables one abutment and vane seal to relieve excessive pressure from each side of the disk 16.

It should here be understood that while a relief passageway 58 is shown in association with a vane seal 41 and a corresponding relief passageway 158 is shown in association with an abutment seal 49 that in many instances only one relief passage may be necessary and this relief passageway may be in association with either a vane or abutment seal.

Referring now in particular to the modified form of actuator shown in FIGURES 4 and 5 of the drawings, the actuator in these figures is similar to the actuator shown in FIGURES 1 and 2, except that in this actuator an abutment 70 extends entirely across the housing with the result that the radial loads on a wing shaft 71 for the damper are not entirely balanced.

In the form of the invention illustrated in FIGURES 4 and 5, the actuator housing is in two abutting parts 73 and 74 bolted together by through bolts 72. The inner peripheries of the abutting parts 73 and 74 form an annular working chamber 75 when the two parts are bolted together.

The parts 73 and 74 are spaced apart by a spacer sleeve 76 externally sealed to the housing parts 73 and 74 by O-ring seals 77. A fluid reaction divider 79 extends transversely of the spacer sleeve 76 and is secured to the chamber 75 by dowel pins 80 in the housing parts 73 and 74. The fluid reaction divider 79 has a sealing slot 81 extending thereabout having an O-ring 82 therein backing up a plastic or Teflon seal 83 extending about said divider and conforming to the walls of the chamber 75, and sealing said divider thereto.

Inlet passageways 84 lead into the chamber 75 on opposite sides of the divider 70 for admitting fluid under pressure to either side of said divider. Check valve passageways 85 spaced closer to opposite walls of the divider 70 than the inlet passageways 84 are provided to block the passage of damping fluid out of the passageway 84 forming the return passageway, to cushion the wing shaft 71 at the ends of its strokes.

The shaft 71 has an annular disk 86 welded or otherwise secured thereto and extending within a slot 87 between the housing parts 73 and 74 and having spaced chordal fingers 88 extending within the annular actuator chamber 75. The spaced fingers 88 form mountings for vanes 89 having ledges 90 extending along the chordal fingers 88 and secured thereto as by dowel pins 91 and through bolts 93. The vanes 89 have aligned sealing grooves extending thereabout receiving an O-ring 94 backing up a Teflon seal 95 like the Teflon seal 83. The Teflon seal 95 conforms to the form of the annular damping chamber and seals the vanes 89 thereto.

It should here be understood that hydraulic circuits including actuators of the class described, are frequently subjected to high pressure surges, caused by impact loads, sudden closing of valves and the like. A hydraulic actuator connected in such circuits may be subjected to these high surge pressures in one chamber or the other, or excessive pressures may be developed when the actuator is traveling at high speed with an inertia load and the outlet valve is suddenly closed, resulting in trapping of the fluid within the actuator in the decreasing volume chambers. Under such conditions, extremely high pressures frequently develop which may be of such a magnitude as to rupture the actuator, such as by breaking the wings from the wing shaft, rupture the body due to excessive hoop tension, causing the bolts or cover nuts to release, shearing of the shaft or like failures.

In the actuator of the present invention the characteristic of stretching of the bolts that retain the halves of the casing together is taken advantage of in connection with the particular abutment and vane seals disclosed, to avoid this breakage under the foregoing excessive loads. The bolts 72 are normally preloaded to a predetermined value which is sufficient to securely hold the casing parts seated against the spacer sleeve 76, under normal operating pressures. When these normal pressures are exceeded, the housing parts 73 and 74 will lift away in axial directions from the ends of the spacer sleeve 76, exposing a clearance between the end of the spacer sleeve and the housing parts, through which fluid escapes into the O-ring groove annulus in which the O-rings 77, 77 are seated. Pressure will thus build up in the grooves for the O-rings 77, 77. The abutment seal 83 thus serves as a relief valve to relieve pressure from the groove for the O-rings 77, 77 and accommodate the fluid to pass by the abutment seal to the low pressure chamber of the actuator. This is due to the leakage flow across the abutment around the seal, which due to stretching of the bolt is at a sufficiently high rate to adequately protect the actuator from sudden pressure surges or shock mentioned in the foregoing.

It should further be noted that the parts 73 and 74 of the actuator casing overlap the spacer 76 substantial amounts, and because of the radial depths of the overlapping portions 73 and 74 extending along the outer periphery of the spacer 76 and the overlap of the portions 73 and 74 along the spacer 76, the overlapping parts 73 and 74 help keep the spacer 76 round and provide a radial squeeze on the external seal 77, 77.

The shaft 71 is journalled within the housing part 73 and a sleeve 96 mounted within the housing part 74 in a well known manner and has a hollow interior portion 97 having a sleeve 99 extending therein and sealed thereto. The sleeve 99 has a recessed portion 100 extending thereabout and forming an annular pressure passageway for the passage of fluid from a passageway 101 extending along the shaft 71 radially outwardly of the sleeve 99 to spaced radial passageways 103 supplying fluid under pressure to pistons 104 and pressurizing face seals 105, sealing opposite beveled walls of the slot 87 and the outer faces of the disk 86.

The face seals 105 each abut opposite faces of the disk 86 and are maintained in sealing engagement therewith by the action of inclined sealing faces 106 of said face seals against the inclined walls forming the slot 87, through which the disk 86 extends.

The face seals 105 are pressurized by back up rings 107 engaged by the pistons 104 slidably mounted in the shaft 71 for radial movement with respect thereto. Fluid under pressure is admitted to the passageway 101 through radial passageways 109 opening to the periphery of the disk 86 and extending radially therethrough and into the shaft 71 and having fluid communication with the passageways 101, 100 and 103.

Thus, as fluid under pressure is admitted to the actuator chamber 75 to rotate the vanes 89 and disk 86, fluid pressure will also flow through the radial passageways 109 and pressurize the pistons 104 and seal 105 to seal the disk 86 and wing shaft assembly to the toroidal working chamber 75.

It may be seen that the actuator of the modified form of the invention is constructed on the same general principles as the actuator shown in FIGURES 1 and 2, but that with the modified form of actuator only one set of face seals is required and only one set of vane seals is used for the abutment and oppositely extending vanes.

While I have herein shown and described several forms in which my invention may be embodied, it may be understood that various modifications and variations in the invention may be attained without departing from the spirit and scope of the novel concepts thereof as defined by the claims appended hereto.

I claim as my invention:

1. In a rotary actuator, a housing having an annular actuator chamber therein having rectangular walls, a shaft rotatably journalled within said housing in inwardly spaced relation with respect to said actuator chamber, said housing having a continuous slot therein opening from said shaft to said chamber, a disk on said shaft extending through said slot and into said chamber, a pair of aligned stationary abutments mounted within said chamber on opposite sides of said disk, sealing means sealing said abutments to said chamber and disk, a pair of aligned wings extending from opposite sides of said disk and secured thereto, means sealing said wings to said chamber, said wings with said abutments dividing said chamber into two pairs of working chambers of increasing and decreasing volume, said disk having a reduced cross-sectional area portion within said slot and having internal cylindrical faces in general alignment with the inner margin of said chamber, and double faced sealing means in said reduced cross-sectional area portion for sealing said disk to said slot comprising a sealing ring on opposite sides of said disk and having right angled sealing faces, one of said sealing faces having sealing engagement with said internal cylindrical wall of said disk and the other of said sealing faces having sealing engagement with the wall of said slot, a retainer for each sealing ring, and means pressurizing said retainers to maintain said sealing rings in sealing engagement with said slot and disk.

2. In a rotary actuator, a housing having two facing housing parts having annular recessed portions therein facing each other and defining an annular actuator chamber having generally rectangular walls, a spacer extending about said chamber and spacing said parts apart, sealing means extending about said spacer and sealing said spacer to said parts, a shaft rotatably journalled within said housing, each housing part having an annular wall portion extending about said shaft, the outer margins of which define the inner margins of said actuator chamber, said annular wall portions being spaced apart at their inner ends to define a slot affording communication between said shaft and said actuator chamber, a disk on said shaft extending through said slot into said actuator chamber, a fixed abutment extending across said recessed portions and fixedly mounted therein and sealed thereto, and a pair of aligned sliding vanes extending from opposite faces of said disk into said recessed portions and secured to said disk for movement therewith, said fixed abutment and said vanes having sealing means extending thereabout sealing said abutment and said vanes to said actuator chamber, and means sealing said disk to said slot comprising annular double faced seals, said seals each having one portion engaging a wall of said slot and another portion at an angle to said one portion and engaging said disk, retainers for said seals, and pressure means backing up said retainers, comprising a plurality of pistons slidably mounted in said shaft for radial movement with respect thereto, and fluid pressure passageways from said actuator chamber to said pistons for forcing said pistons to urge said double faced seals radially outwardly with respect to said shaft.

3. In a rotary actuator, a housing having two facing housing parts having annular recessed portions therein facing each other and defining an annular actuator chamber having generally rectangular walls, a spacer extending about said chamber and spacing said parts apart, sealing means extending about said spacer and sealing said spacer to said parts, a shaft rotatably journalled within said housing, each housing part having an annular wall portion extending about said shaft, the outer margins of which define the inner margins of said actuator chamber, said annular wall portions being spaced apart at their inner ends to define a slot affording communication between said shaft and said actuator chamber, a disk on said shaft extending through said slot into said actuator chamber, a fixed abutment extending across said recessed portions and fixedly mounted therein and sealed thereto, and a pair of aligned sliding vanes extending from opposite faces of said disk into said recessed portions and secured to said disk for movement therewith, the adjacent ends of said annular wall portions being beveled and diverging axially outwardly with respect to said chamber as they extend radially inwardly toward said shaft, double faced seals having beveled faces engaging the beveled ends of said annular wall portions and having other sealing faces, engaging opposite faces of said disk, retainer rings backing up said seals, and means for applying pressure to said retainer rings and urging said seals radially outwardly with respect to said disk.

4. In a rotary actuator, a housing having two facing housing parts having annular recessed portions therein facing each other and defining an annular actuator chamber having generally rectangular walls, a spacer extending about said chamber and spacing said parts apart, sealing means extending about said spacer and sealing said spacer to said parts, a shaft rotatably journalled within said housing, each housing part having an annular wall portion extending about said shaft, the outer margins of which define the inner margins of said actuator chamber, said annular wall portions being spaced apart at their inner ends to define a slot affording communication between said shaft and said actuator chamber, a disk on said shaft extending through said slot into said actuator chamber, a fixed abutment extending across said recessed portions and fixedly mounted therein and sealed thereto, and a pair of aligned sliding vanes extending from opposite faces of said disk into said recessed portions and secured to said disk for movement therewith, the adjacent ends of said annular wall portions being beveled and diverging axially outwardly with respect to said chamber as they extend radially inwardly toward said shaft, double faced seals having beveled faces engaging the beveled ends of said annular wall portions and having other sealing faces, engaging opposite faces of said disk, retainer rings backing up said seals, means for applying pressure to said retainer rings and urging said seals radially outwardly with respect to said disks, comprising a plurality of pistons slidably mounted in said shaft and extending radially outwardly therefrom into engagement with said retainer rings, and fluid pressure passageways from said actuator chamber to said pistons.

5. In a rotary actuator, a housing having two aligned facing housing parts having annular recessed portions therein facing each other and defining an annular actuator chamber having generally rectangular walls, a shaft journalled within said housing, said housing parts having annular wall portions extending about said shaft, the outer margins of which define the inner margins of said actuator chamber, said wall portions being spaced apart at their inner ends to define a slot, a disk on said shaft extending through said slot, a fixed abutment in each recessed portion of each housing part, said abutments being aligned and fixed to said housing parts and having slidable engagement with opposite faces of the annular wall portion of said recess and the facing end portions of said annular walls, sealing rings having right angled sealing faces having sealing engagement with said internal annular wall portions of said disk and the facing end portions of said annular walls, retainers backing up said sealing rings, and spring means pressurizing said retainers and biasing said sealing rings into sealing engagement with said annular wall portions and the adjacent ends of said annular walls and into sealing engagement with the external and internal cylindrical wall portions of said disk.

6. In a sealing means for two relatively movable metal parts having four metal faces intersecting at 90° corners, a plastic seal having two right angled sealing faces extending along two of said metal faces and intersecting at one of said right angled corners, an annular plastic seal having right angled intersecting sealing faces extending along two other of said metal faces diagonally opposite from said first mentioned metal faces, the point of intersection of said sealing faces of said annular plastic seals being at said intersecting corners and the point of intersection of said metal faces and said plastic sealing faces being a point of no substantial area.

7. In a sealing means for sealing the space between a housing part and a shaft movable relatively to said housing part, in which the housing part and shaft each have two intersecting right angled metal faces intersecting at a point of no substantial area, an annular plastic seal having two intersecting right angled sealing faces engaging a face of said housing part and a face of said shaft and extending along said faces to the point of intersection thereof, spring means maintaining said annular seal into engagement with said right angled metal faces, and a second plastic seal having two intersecting right angled sealing faces engaging a face of said housing part and a face of said shaft and extending along said faces to the point of intersection thereof, and a pressure passageway leading from the space behind said annular seal, to the face of a plastic seal, and accommodating pressure behind said annular seal to lift said plastic seal and thereby relieve said annular seal from the accumulation of pressure behind said seal.

8. In a rotary actuator, a housing having an actuator chamber therein, a shaft rotatably journalled in said housing, a stationary abutment in said actuator chamber, a sliding vane mounted on said shaft and having slidable engagement with the wall of said chamber, means admitting fluid under pressure to said actuator chamber on one side of said abutment, other means releasing fluid under pressure from said actuator chamber on the opposite side of said abutment, sealing means extending about said stationary abutment, and sealing said stationary abutment to said actuator chamber, sealing means extending about said sliding vane and sealing said sliding vane to said actuator chamber and dividing said actuator chamber into high and low pressure chambers on opposite sides of said sliding vane, there being at least two right angled faces to be sealed between said shaft and said actuator chamber, and means for sealing said faces comprising an annular sealing ring having a flat sealing face, a cylindrical sealing face and a beveled rear face, an annular retainer having a beveled forward face conforming to the beveled rear face of said seal, spring means forcing said annular retainer against said seal and biasing said seal axially and radially into sealing engagement with the faces to be sealed, the portion of said seal extending along said high pressure chamber acting as a check valve and accommodating the flow of fluid under pressure to engage the portion of said seal extending along said low pressure chamber to seal said low pressure chamber against the passage of fluid past said annular seal into said low pressure chamber.

9. In a rotary actuator, a housing having an actuator chamber therein, a shaft rotatably journalled in said housing, a stationary abutment in said actuator chamber, a sliding vane mounted on said shaft, means admitting fluid under pressure to said actuator chamber on one side of said abutmnet, other means releasing fluid under pressure from said actuator chamber on the opposite side of said abutment, sealing means extending about said stationary abutment and sealing said abutment to said actuator chamber, sealing means extending about said sliding vane and sealing said sliding vane to said actuator chamber and dividing said actuator chamber into high and low pressure chambers on opposite sides of said sliding vane, there being at least two right angled faces to be sealed between said shaft and said actuator chamber, means for sealing said faces comprising an annular sealing ring having a flat sealing face, a cylindrical sealing face extending at an angle to said flat sealing face and spring means biasing said seal axially and radially into sealing engagement with the faces to be sealed, the sealing faces of said seals extending about said stationary abutment and said sliding vane and said sealing faces of said annular seal intersecting at points of no substantial area and said annular seal accommodating the passage of fluid under pressure from said high pressure chamber to the region of said shaft and preventing fluid under pressure in the region of said shaft from passing to said high and low pressure chambers.

10. In a rotary actuator, a housing having an actuator chamber therein, a shaft rotatably journalled in said housing, a stationary abutment in said actuator chamber, a rotatable vane mounted on said shaft, means admitting fluid under pressure to said actuator chamber on one side of said abutment, other means releasing fluid under pressure from said actuator chamber on the opposite side of said abutment, plastic sealing means having flat sealing faces extending about said stationary abutment and sealing said abutment to said actuator chamber, plastic sealing means having flat sealing faces extending about said sliding vane and sealing said sliding vane to said actuator chamber and dividing said actuator chamber into high and low pressure chambers on opposite sides of said sliding vane, there being at least two right angled faces to be sealed between said shaft and said actuator chamber, means for sealing said faces comprising an annular sealing ring having a flat sealing face, a cylindrical sealing face extending at an angle to said flat sealing face and spring means biasing said seal axially and radially into sealing engagement with the faces to be sealed, the flat sealing faces of said plastic sealing means extending about said stationary abutment and said sliding vane and said sealing faces of said annular seal intersecting at points of no substantial area and said annular seal accommodating the passage of fluid under pressure from said high pressure chamber to the region of said shaft and preventing fluid under pressure in the region of said shaft from passing to said high and low pressure chambers, and a passageway leading from the region of said shaft behind said annular seal to a flat sealing face of one of said plastic seals accommodating pressure behind said annular seal to lift said plastic seal upon reductions in pressure in said high pressure chamber and to thereby relieve fluid under pressure from behind said annular seal.

11. In a rotary actuator, a housing having an actuator chamber therein, a shaft rotatably journalled in said housing, a stationary abutment in said actuator chamber, a rotatable vane on said shaft, means admitting fluid under pressure to said actuator chamber on one side of said abutment, other means releasing fluid under pressure from said actuator chamber on the opposite side of said abutment, a plastic seal extending about said stationary abutment and having a flat face sealing said abutment to said actuator chamber, a plastic seal extending about said rotatable vane and having a flat sealing face sealing said sliding vane to said actuator chamber and dividing said actuator chamber into high and low pressure chambers on opposite sides of said sliding vane, there being at least two right angled faces to be sealed between said shaft and said actuator chamber, means for sealing said faces comprising an annular plastic sealing ring having a flat sealing face, a cylindrical sealing face and a beveled rear face, an annular retainer having a beveled forward face conforming to the beveled rear face of said plastic seal, spring means forcing said annular retainer against said plastic seal and biasing said plastic seal axially and radially into the faces to be sealed, the portion of said annular seal extending along said high pressure chamber acting as a check valve and accommodating fluid under pressure to pass thereby and engage the portion of said seal extending along said low pressure chamber, and a passageway leading from a region behind said annular seal to a flat sealing face of a plastic seal and supplying fluid under pressure to lift said plastic seal upon reduction in pressure in said high pressure chamber below the pressure in the region behind said annular seal, and accommodating the release of pressure behind said annular seal and the flow of fluid under pressure along said passageway past said plastic seal.

12. In a rotary actuator, a housing comprising two housing parts having aligned recessed portions having internal cylindrical walls, a spacer member retaining said parts in aligned relation and having an external wall abutting said internal wall and also having an internal cylindrical wall cooperating with said recessed portions of said housing parts, to form a working chamber, securing means securing said housing parts to said spacer member, a fluid reaction divider extending transversely of said spacer member and having a slot extending thereabout having a plastic seal therein conforming to the walls of said working chamber, said spacer member having sealing grooves in the external wall thereof and extending about opposite ends thereof, O-ring seals in said sealing grooves pressed into sealing engagement with said internal cylindrical walls of said housing parts, a shaft journalled in said housing, a sliding vane extending radially of said shaft and having slidable engagement with the internal wall of said spacer member, fluid pressure inlets on opposite sides of said abutment, said securing means being pre-loaded to normal working pressures and sudden impact surges and shocks stretching said securing means and accommodating the leakage of fluid to said sealing grooves, and said abutment seal relieving the building up of pressure in said sealing grooves and accommodating leakage flow across said abutment seal to the low pressure chamber of the actuator.

13. In a rotary actuator, a housing comprising two housing parts having facing aligned recessed portions having internal cylindrical walls and annular end walls, a spacer member retaining said parts in spaced relation with respect to each other and having an external wall abutting said internal cylindrical walls of said housing parts and having an internal cylindrical wall cooperating with said recessed portions to form a working chamber, securing means securing said annular walls of said housing parts into abutting engagement with the end walls of said spacer member, a fluid reaction divider within said working chamber and extending transversely of said spacer member, a shaft journalled in said housing, a sliding vane extending radially of said shaft and having slidable engagement with the internal wall of said spacer member, fluid pressure inlets on opposite sides of said abutment accommodating fluid under pressure to enter one of said inlets and rotate said vane and shaft and to be released from the low pressure side of said vane through the other of said inlets, said fluid reaction divider having a slot extending thereabout having a plastic seal therein conforming to the walls of said chamber, said spacer member having sealing grooves extending about opposite ends thereof having O-ring seals therein pressed into sealing engagement with said internal cylindrical walls of said housing parts, and the securing means securing said housing parts to said spacer member being bolts preloaded to normal working pressures within said housing, whereby sudden impact surges and shock within said housing will stretch said bolts and provide a leakage space between the ends of said spacer member and said annular walls of said housing parts, to accommodate the leakage of high pressure fluid into said sealing grooves, and said abutment seal accommodating the flow of fluid from said sealing grooves to the low pressure side of said sliding vane.

14. In a rotary actuator, a housing comprising two aligned housing parts having aligned recessed portions having internal cylindrical walls, a spacer member retaining said parts in spaced relation and having an external wall overlapped by said internal walls of said parts and having an internal cylindrical wall, the internal wall of said spacer member with said recessed portions of said housing parts forming a toroidal working chamber, through bolts pre-loaded to normal working pressures in said working chamber and securing said housing parts into abutting engagement with opposite ends of said spacer member, said spacer member having external sealing grooves extending about opposite ends thereof having O-ring seals therein, pressed into sealing engagement with said internal cylindrical walls of said housing parts, a shaft journalled in said housing, a sliding vane extending radially of said shaft and having a slot extending thereabout having a seal therein having slidable engagement with the internal wall of said spacer member, a fluid reaction divider extending transversely of said spacer member and secured to said housing parts and having a slot extending thereabout having a seal therein conforming to the walls of said working chamber, said fluid reaction divider and said sliding vane dividing said working chamber into a high pressure chamber on one side of said fluid reaction divider and a low pressure chamber on the opposite side of said fluid reaction divider, sudden surges in pressure in said high pressure chamber stretching said bolts and accommodating the leakage of fluid to said sealing grooves and building up pressure therein, and said abutment seal forming a relief valve accommodating the flow of high pressure fluid from said sealing grooves past said abutment seal into the low pressure chamber of the actuator.

References Cited in the file of this patent
UNITED STATES PATENTS

| | | |
|---|---|---|
| 342,721 | Wood | May 25, 1886 |
| 723,656 | Dunn | Mar. 24, 1903 |
| 855,073 | Sparkes | May 28, 1907 |
| 895,861 | Hokanson | Aug. 11, 1908 |
| 1,039,562 | Martin | Sept. 24, 1912 |
| 1,250,569 | Desmond | Dec. 18, 1917 |
| 1,769,372 | Koehn | July 1, 1930 |
| 2,550,849 | Morris | May 1, 1951 |
| 2,798,462 | Ludwig et al. | July 9, 1957 |